United States Patent [19]
Robertson et al.

[11] Patent Number: 6,034,653
[45] Date of Patent: Mar. 7, 2000

[54] HEAD-SET DISPLAY DEVICE

[75] Inventors: James B. Robertson, Aptos; Niall D. Macken, Santa Cruz; David P. Moriconi, Ben Lomond; Andrew G. Austin, Aptos, all of Calif.; Thomas M. Murphy, Nederland; Mark G. Willner, Boulder, both of Colo.

[73] Assignee: Colorado MicroDisplay, Inc., Boulder, Colo.

[21] Appl. No.: 08/904,515

[22] Filed: Aug. 1, 1997

[51] Int. Cl.⁷ ........................................................ G09G 5/00
[52] U.S. Cl. .................. 345/8; 348/794; 348/53; 349/11; 349/13; 359/630
[58] Field of Search ..................... 345/7, 8, 9; 348/794, 348/53; 349/11, 13; 359/13, 14, 630, 631, 632, 633

[56] References Cited

U.S. PATENT DOCUMENTS

| | | | |
|---|---|---|---|
| D. 337,320 | 7/1993 | Hunter et al. | D14/113 |
| 3,608,935 | 9/1971 | Hodapp, Jr. | |
| 4,156,292 | 5/1979 | Helm et al. | |
| 4,753,514 | 6/1988 | Kubik | 350/174 |
| 5,153,569 | 10/1992 | Kawamura et al. | 345/8 |
| 5,293,271 | 3/1994 | Merritt et al. | |
| 5,426,526 | 6/1995 | Yamamoto et al. | |
| 5,457,751 | 10/1995 | Such | 381/183 |
| 5,488,438 | 1/1996 | Cochran | 351/45 |
| 5,546,099 | 8/1996 | Quint et al. | 345/8 |
| 5,673,059 | 9/1997 | Zavracky et al. | 345/8 |
| 5,739,797 | 4/1998 | Karasawa et al. | 345/8 |
| 5,742,263 | 4/1998 | Wang et al. | 345/8 |
| 5,815,126 | 9/1998 | Fan et al. | |

FOREIGN PATENT DOCUMENTS

| | | |
|---|---|---|
| 0 344 881 | 2/1989 | European Pat. Off. . |
| 0 389 403 | 2/1990 | European Pat. Off. . |
| 0 551 781 | 12/1992 | European Pat. Off. . |
| 0 575 257 | 6/1993 | European Pat. Off. . |
| 2 457 648 | 12/1980 | France . |
| 1 804 431 | 6/1971 | Germany . |
| WO 94/24658 | 10/1994 | WIPO . |
| WO 95/11473 | 4/1995 | WIPO . |
| WO 98/13721 | 4/1998 | WIPO . |

OTHER PUBLICATIONS

Von Rainer Grabowski, "Es Liegt Was In Der Luft," Chip, No. 6, Jun. 1990, pp. 20–24.
James E. Melzer and Kirk Moffitt, "Head–Mounted Displays Designing for the User," McGraw–Hill, 1997, pp. 5–8; p. 56; p. 279.

*Primary Examiner*—Dennis-Doon Chow
*Assistant Examiner*—Amr Awad
*Attorney, Agent, or Firm*—Blakely, Sokoloff, Taylor & Zafman

[57] ABSTRACT

The invention relates to a display head-set device that includes a support member and a display-optics interface pod coupled to one of a left handle portion and a right handle portion of the support member. The display-optics interface pod houses an image display for viewing by a user. In one embodiment, the display head-set resembles a pair of eye glasses with the interface pod attached to one of the left handle portion and the right handle portion of the support member by an arm clip and extending into the field of vision to offer a monocular viewing sight to the user.

5 Claims, 15 Drawing Sheets

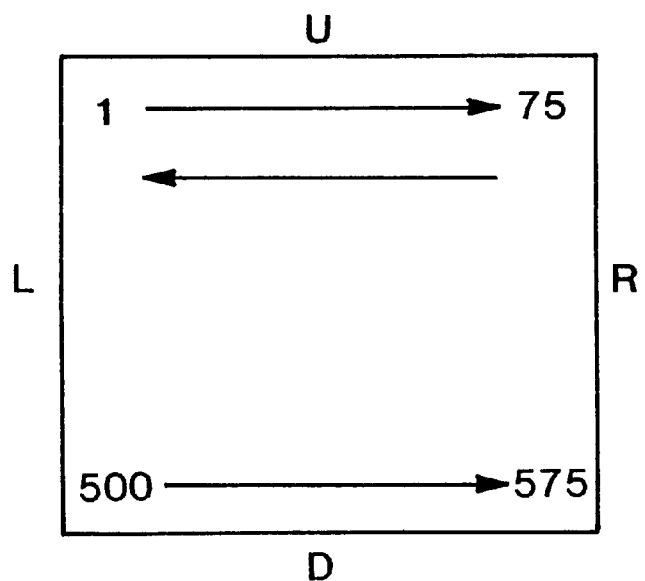
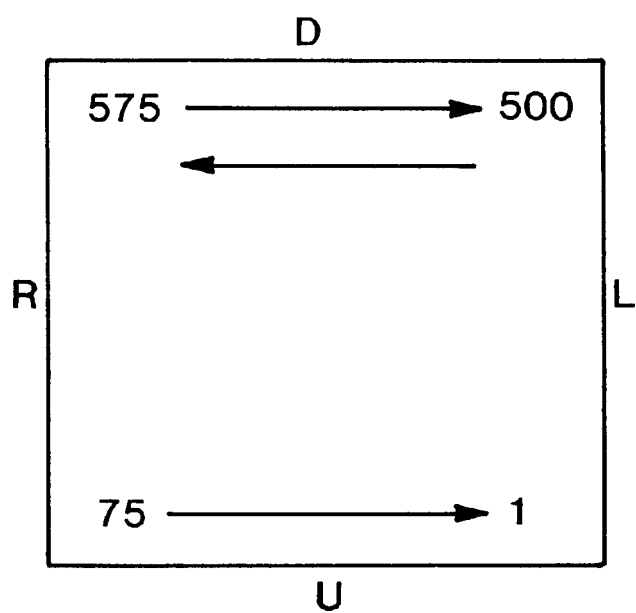
FIG. 10

HEAD-SET DISPLAY DEVICE

BACKGROUND OF THE INVENTION

1. Field of the Invention

The invention relates to electronic imaging and more particularly to image display devices.

2. Description of Related Art

Head-mounted display or display head-set devices are devices that are mounted on a human head and that deliver an image, such as from a cathode ray tube or liquid crystal display, visible to one or both eyes.

Display head-set devices have found uses in military applications. The devices are used in the Air Force for flight simulation. These devices are made up of typically bulky binocular goggles that restrict the field of view of each eye to the image displayed in front of the goggles.

The U.S. Army deploys the Honeywell Integrated Helmet and Display Sighting System (IHADSS) on the AH-64 Apache helicopter. The IHADSS features a monocular display mounted on the side of the pilot's helmet and linked to infrared sensors and weapons visible to the pilot's eye. The IHADSS provides a monochrome image with user-accessible adjustments. It is attached to a helicopter flight helmet and is certified by the Army as crash-worthy. The display is not interchangeable between eyes, such as for example, a user's preference for use with a dominant eye which might be different for each particular user. Further, the device is not easily adjustable to fit different head sizes and viewing angles. Although, the display arm of the device provides some up/down adjustment, the primary adjustment limitation is the helmet to which the display is affixed. Users of the IHADSS are only those that possess a head size that fits the helmet. Accordingly, a commercial application of such a device, with different size helmets and differently positioned displays would be a costly venture resulting in a costly product.

Commercial applications of display head-sets include uses for virtual reality simulation. These devices are similar in operation to the flight simulation displays used by the Air Force, with the exception that the new designs are lighter weight and not as bulky on the human head. Similar to the Air Force displays, these devices provide a binocular display to the user and limit the user's entire field of view of each eye to the image on the display.

SUMMARY OF THE INVENTION

A display head-set device is disclosed. The display head-set includes a support member and a display-optics interface pod coupled to one of a left handle portion and a right handle portion of the support member. The display-optics interface pod houses a visual display for viewing by a user. In one embodiment, the display head-set device resembles a pair of eye glasses with the interface pod attached to one of the left handle portion and the right handle portion of the support member by an arm clip and extending into the field of vision. The device offers a lightweight (i.e., minimum head-supported weight), monocular display sight to the user. The display pod is adjustable to accommodate various head sizes and shapes as well as viewing preferences.

Additional features and benefits of the invention will become apparent from the detailed description, figures, and claims set forth below.

BRIEF DESCRIPTION OF THE DRAWINGS

FIG. 10 is a schematic representation of the addressing of a display screen for alternate eyes.

DETAILED DESCRIPTION OF THE INVENTION

Embodiments of the invention include a display head-set device made up of a support member and a display-optics interface pod coupled to one of a left handle portion and a right handle portion of the support member. The display-optics interface pod is adjustably positioned in the line of sight of a user for monocular viewing. Embodiments of the invention also include a display head-set device where the display-optics interface pod is coupled to the support member through a display arm and wherein the display arm has a horizontal and a vertical axis such that the viewing angle of the interface pod is adjustable by rotating the pod about the horizontal and vertical axis of the display arm. Embodiments of the invention still further include a device wherein the display arm itself is rotationally adjustable. Further embodiments of the invention include a device wherein the distance of the pod from the viewers eye is adjustable. Embodiments of the invention yet further include a display head-set device resembling a pair of eyeglasses as well as a device that is to be worn like a pair of eyeglasses or over a pair of eyeglasses. These and other embodiments are set forth herein.

In the following description, numerous specific details are set forth such as specific materials, components, locking and rotating apparati, etc., in order to provide a thorough understanding of the invention. It is to be appreciated that these specific details need not be employed to practice the invention.

Figure 1:
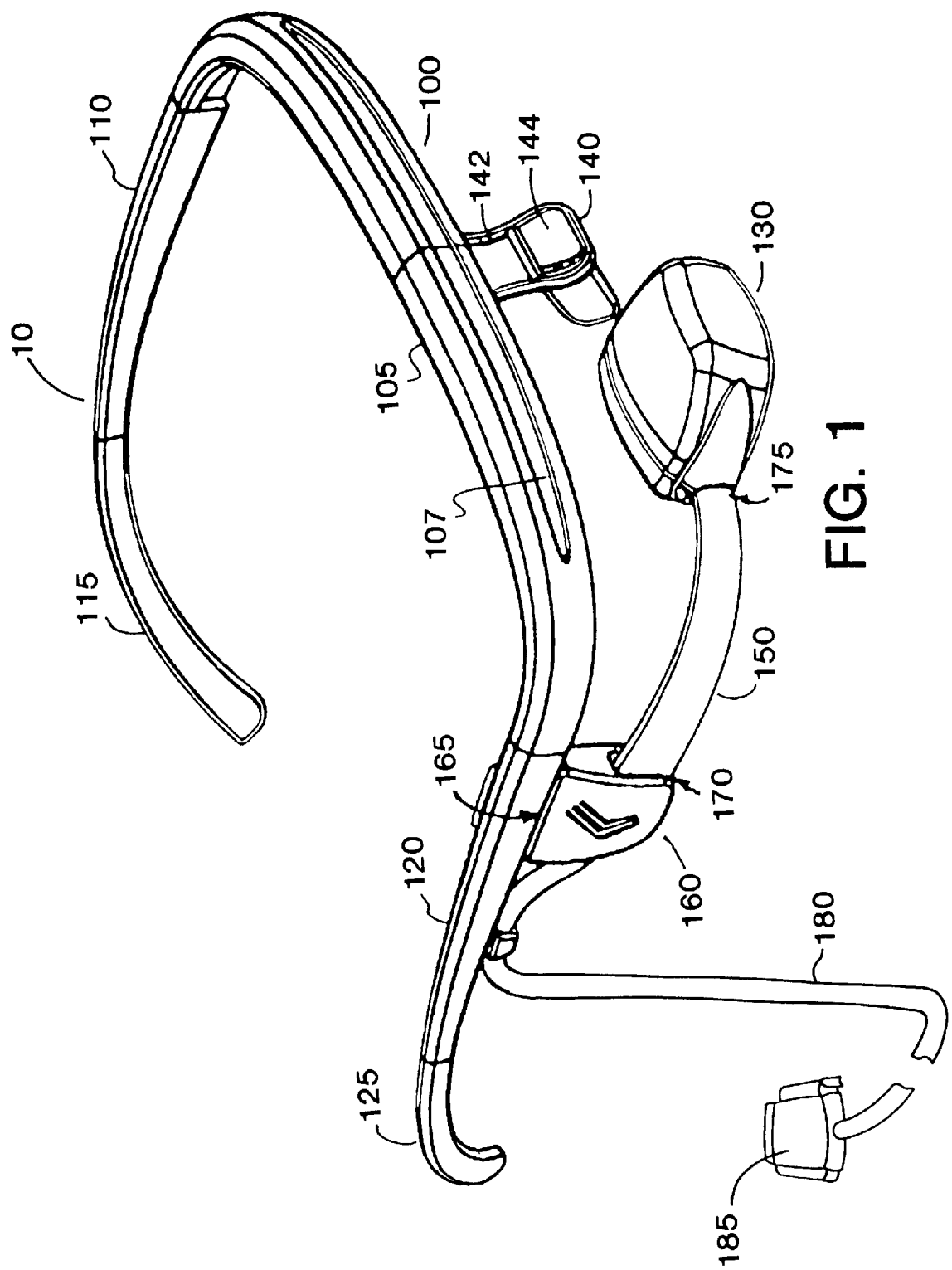
FIG. 1 is a top perspective front view of an embodiment of the display device of the invention showing an interface pod coupled to a right handle portion of the support member.
Figure 2:
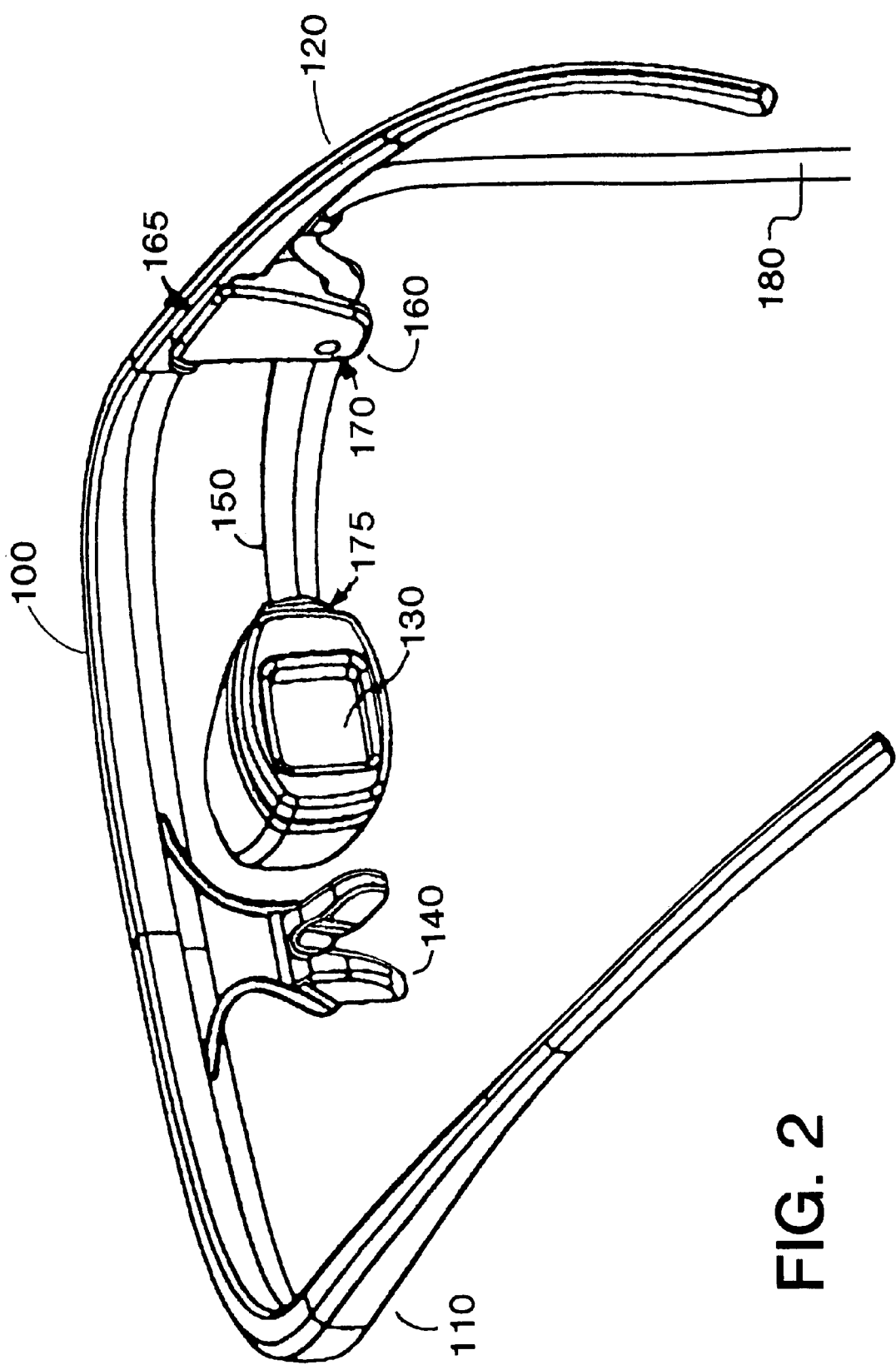
FIG. 2 is a top perspective rear view of an embodiment of the display device of the invention showing an interface pod coupled to a right handle portion of the support member.

FIGS. 1 and 2 show perspective front and rear views, respectively, of an embodiment of the display head-set device of the invention. The device 10 of FIG. 1 includes a support member 100 having a middle portion 105, left handle portion 110 and a right handle portion 120 with ear pieces, 115 and 125, respectively. Support member 100 resembles an eye glass frame, with a middle portion 105 that is generally conformable to the superior ocular region of a human head, and including a nose clip 140 to rest support member 100 on a user's nose. Display-optics interface pod 130 is connected to support member 100 through display arm 150. Display arm 150 is connected to a durable plastic arm clip 160 which is connected to right handle portion 120 of support member 100. In one embodiment, arm clip 160 is detachably mountable to either right handle portion 120 or left handle portion 110 of support member 100, making clip 160 reversible. Display-optics interface pod 130 is electronically linked to, for example, a computer through interface cable 180 and coupling plug 185, to provide a monocular computer display by pod 130.

One function of support member 100 is to provide support and mounting for nose bridge 140, the display-optics interface pod 130, and the device's electronic cable 180. Support member 100 is also lightweight for comfort and safety. In this manner, support member 100 is made of a light, durable material, such as for example, hard plastic material. Support member 100 is ergonomically designed to fit a wide range of male and female heads. Combined with nose bridge 140, support member 100 provides a stable, three-point support on the user's head (i.e., above each ear and over the nose) to maintain a steady display position. In one embodiment, middle portion 105 is designed to fit over conventional eye glasses to allow a user to wear prescription eye glasses while wearing display head-set device 10 of the invention. In the embodiment shown in FIG. 1, middle portion 105 further includes a decorative colored band 107 adorning the front of the device.

Nose bridge 140 rests on the bridge of a user's nose to provide support for display device 10. In the embodiment shown in FIGS. 1 and 2, nose bridge 140 is composed of a wire form mount 142 with an elastomeric nose rest 144. In another embodiment, nose rest 144 is detachable and exchangeable for a nose rest of a different shape. Other configurations, such as for example, a wire form mount with opposing and conforming elastomeric nose pieces, may, of course, be substituted for the nose rest configuration of FIGS. 1 and 2.

Display head-set device 10 is worn in a manner similar to the wearing of eye glasses. In one embodiment, display headset device 10 is monocular, with display-optics interface pod 130 positioned in front of, for example, the right eye of a viewer. The position of interface pod 130 is adjustable to suit the preferences of the user. Arm clip 160 is slidably connected to right handle portion 120 so that the distance of interface pod 130 from a user's eye can be adjusted by moving arm clip 160 either a forward or a backward distance along right handle portion 120 to suit the user's preference. The slidable adjustment mechanism is indicated at reference numeral 165 in FIGS. 1 and 2. Arm clip 160 also contains a rotational adjustment mechanism (indicated at reference numeral 170) that allows the interface pod 130 to be rotated, through the rotation of display arm 150, through an axis of arm clip 160. Rotational adjustment 170 provides both up and down as well as left and right adjustment to allow the user to position interface pod 130 in line with the user's axis of vision. Final position achieved by both adjustment mechanisms 165 and 170 are maintained by conventional means, including friction or a ratchet mechanism.

Figure 3:
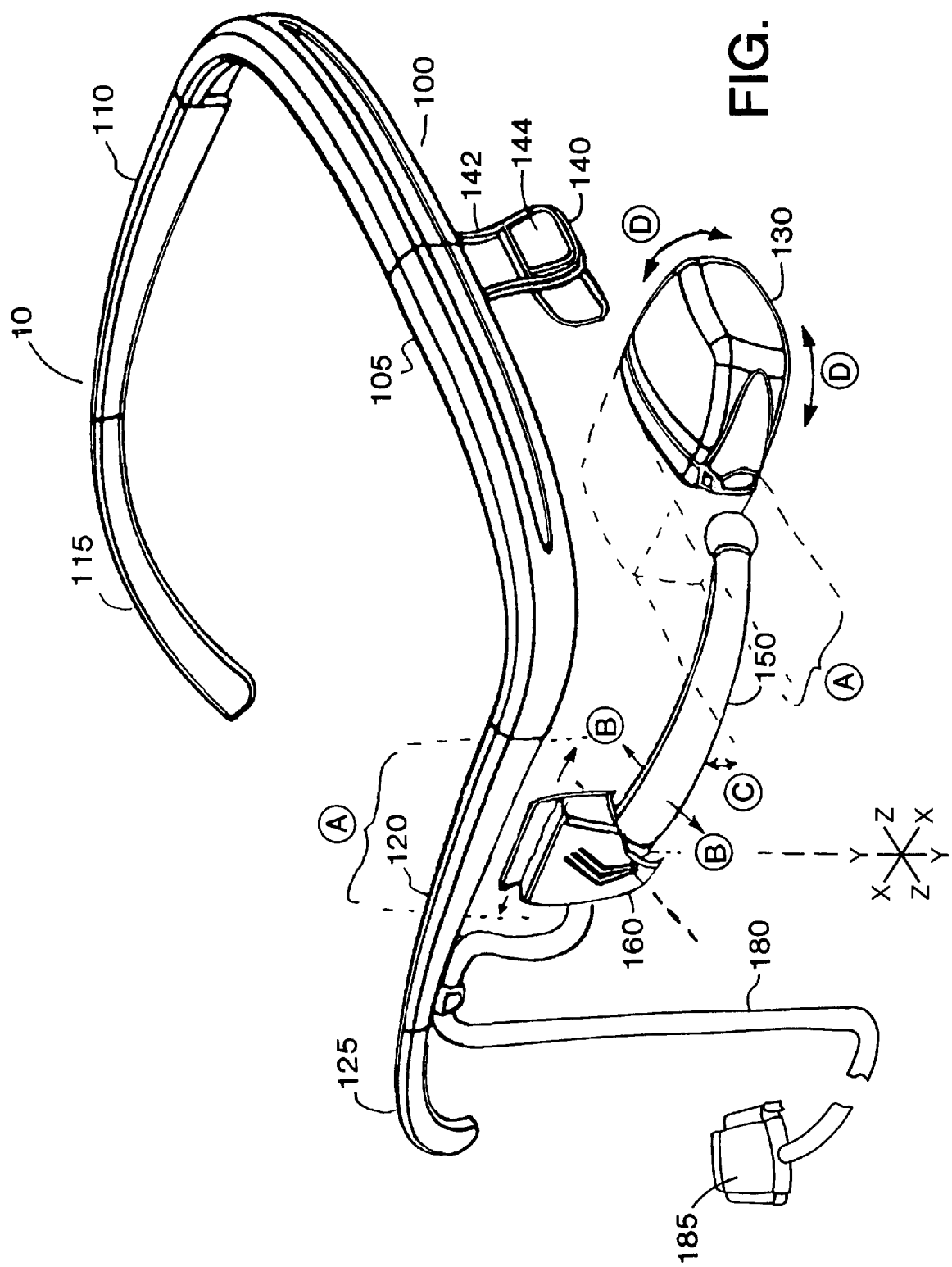
FIG. 3 is an exploded top perspective front view of an embodiment of the device of the invention showing directional and rotational movements of the various components.

FIG. 3 shows the adjustment mechanisms discussed above with reference to FIGS. 1 and 2. As noted, the position of interface pod 130 is adjustable to suit the preferences of the user. In FIG. 3, arm clip 160 is slidably connected to right handle portion 120 so that the distance of interface pod 130 from a user's eye can be adjusted by moving arm clip 160 either a distance denoted by reference letter Ⓐ by moving arm clip 160 either a forward or a backward distance denoted by Ⓐ along right handle portion 120 to suit the user's preference. FIG. 3 also shows the rotational adjustment mechanisms of one embodiment of the device. Reference letter Ⓑ illustrates the rotation of display arm 150 through an axis of arm clip 160. Rotational adjustment Ⓑ is a lateral or left/right adjustment to allow a user to position interface pod 130 in line with the user's access of vision. A second rotational adjustment through a vertical axis of arm clip 160 is illustrated by reference letter Ⓒ and is a vertical or up/down adjustment. The position of interface pod 130 is also rotationally adjustable by rotating interface pod 130 in a circular motion, indicated in FIG. 3 by reference letter Ⓓ, through either a horizontal or vertical axis of display arm 150.

Figure 4:
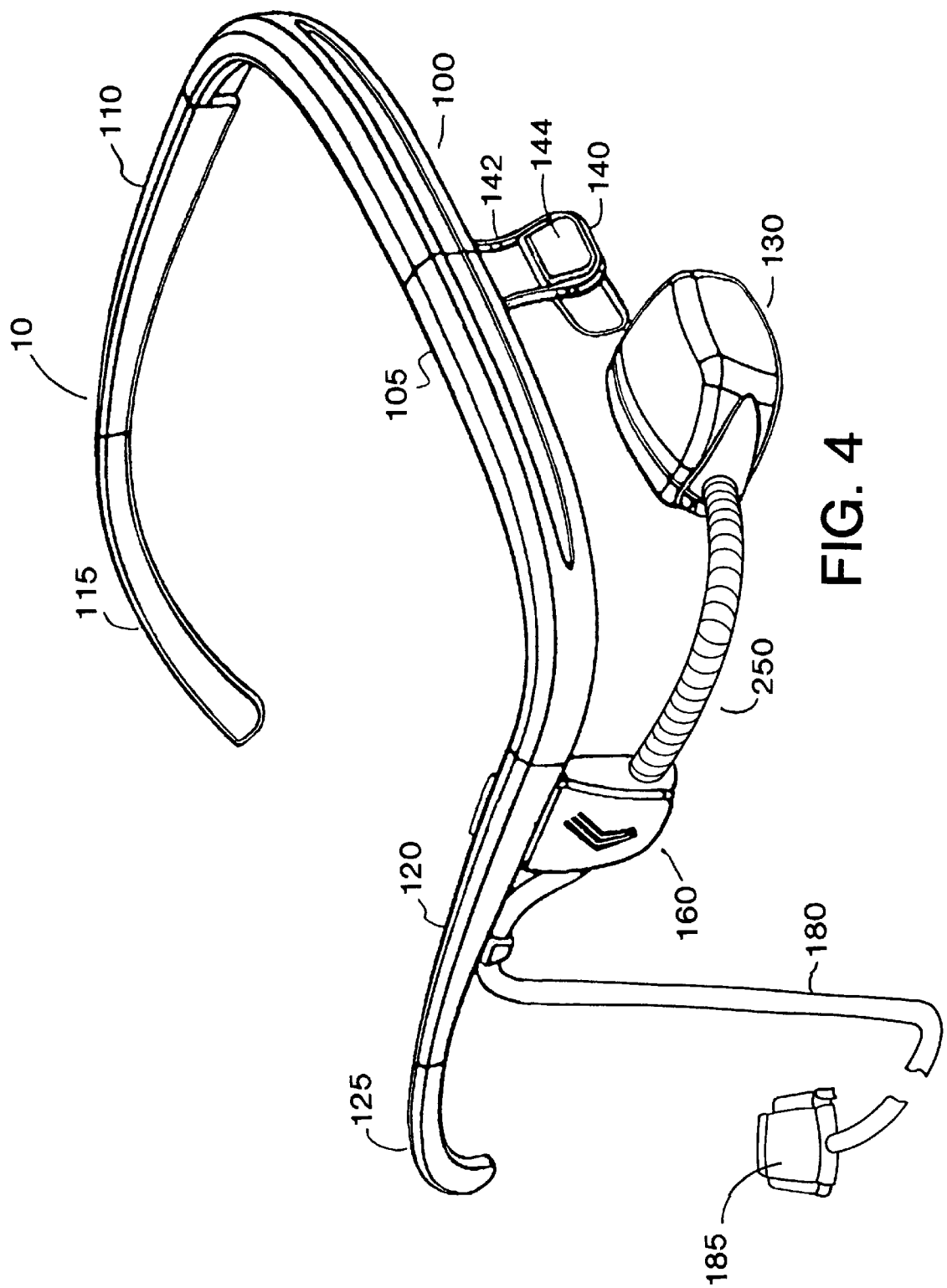
FIG. 4 is a top perspective front view of an embodiment of the display device of the invention showing a flexible display arm coupled to an arm clip and an interface pod.

In another embodiment, illustrated in FIG. 4, arm clip 160 is slidably coupled as before to right or left handle portion 110 or 120, respectively, and display arm 250 is, for example, rigidly coupled to arm clip 160 and pod 130. In this embodiment, display arm 250 is itself flexible/bendable and maintains its position when set. One way this is accomplished is by forming display arm 250 of a plurality of flattened wires, each wrapped around the other. The flexibility of the wire package permits adjustment of display arm 250 and the friction between the wires maintains the adjusted position.

Figure 5:
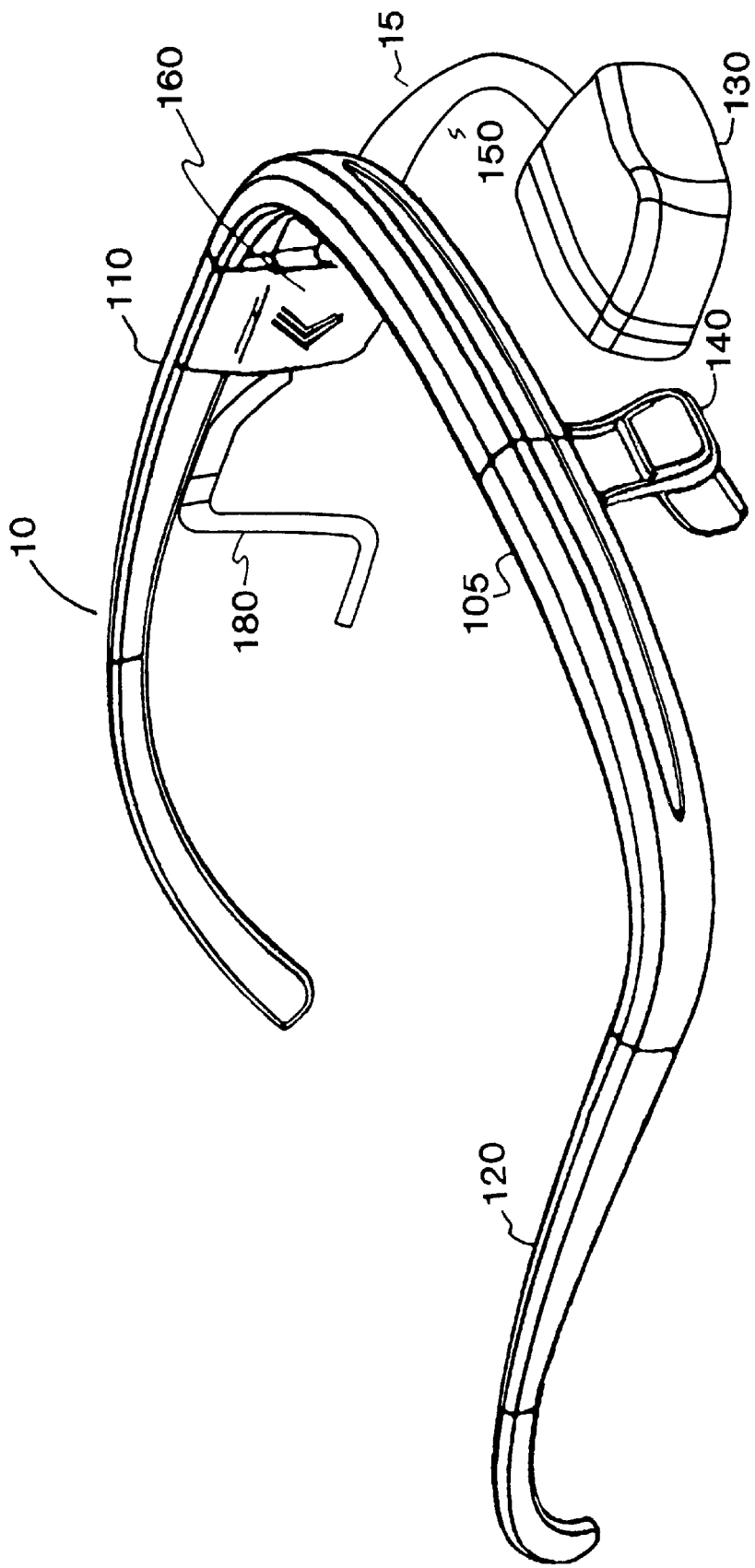
FIG. 5 is a top perspective front view of an embodiment of the display device of the invention showing an interface pod coupled to a left handle portion of the support member.

In one embodiment, display head-set device 10 is monocular, with display-optics interface pod 130 positioned in front of, for example, the right eye of the viewer. In another embodiment, device 10 has mounting brackets on both right handle portion 120 and left handle portion 110. In this embodiment, arm clip 160 is interchangeable between right handle portion 120 and left handle portion 110 to accommodate a viewer's preference for a particular eye. For example, if the viewer's dominant eye is a right eye, arm clip 160 might be attached to right handle portion 120. On the other hand, if a user's dominant eye is the left eye, arm clip 160 might be mounted to left handle portion 110 through a similar mounting mechanism as shown in FIG. 5. This embodiment allows the user to make a choice to change the viewing of the pod from the right and left eyes. The interchangeability of the device to, for example, a user's preference for a dominant eye, is an inexpensive way to accommodate multiple users with a simple adjustable device. In yet another embodiment, the device is binocular, with an interface pod 130 placed in front of both a viewer's left eye and an interface pod 130 placed in front of a viewer's right eye.

Figure 6:
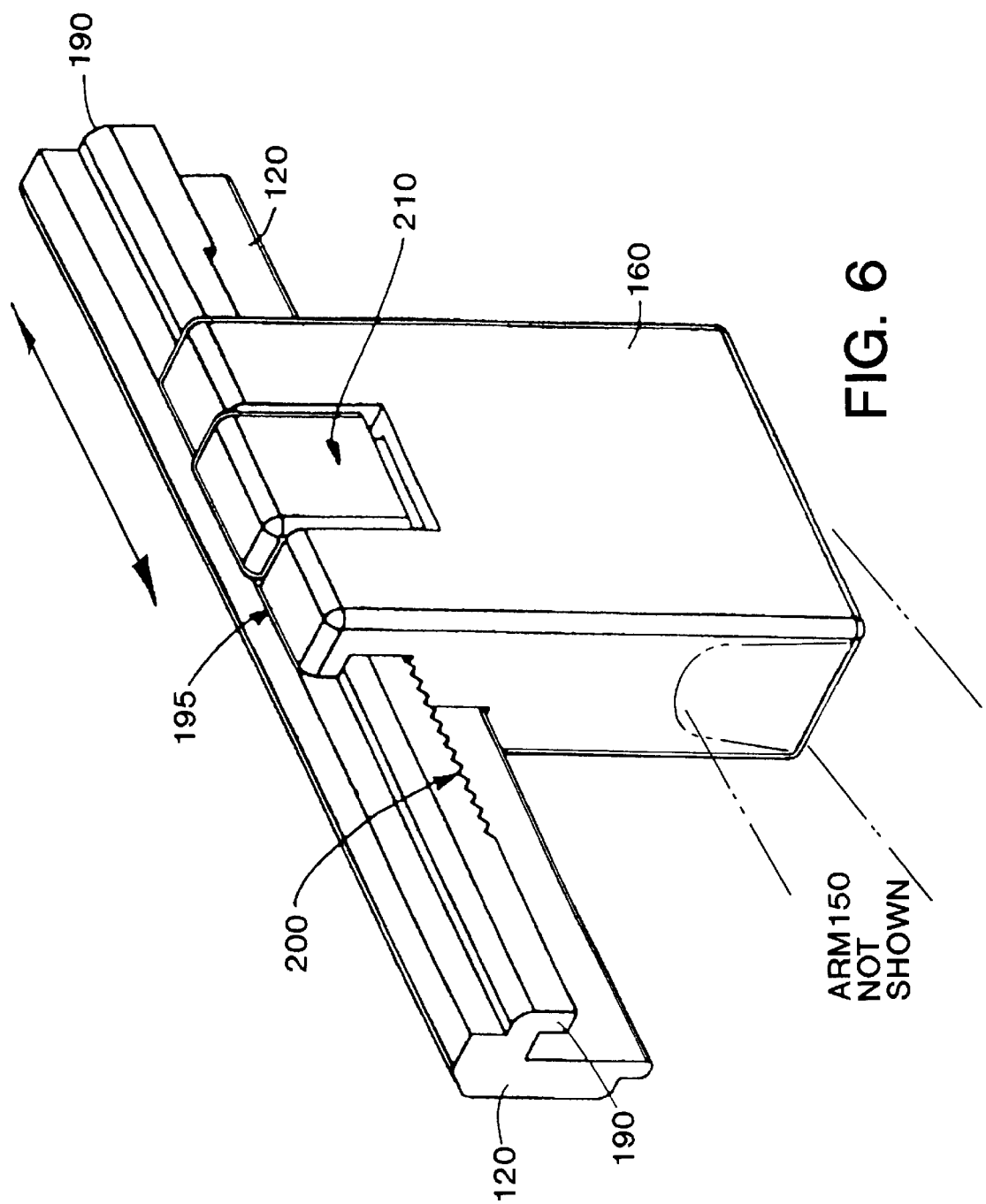
FIG. 6 is a top perspective view of an embodiment of the display device of the invention wherein an arm clip is used to attach a display-optics interface pod to one of the left handle and right handle portions of the support member.
Figure 7:
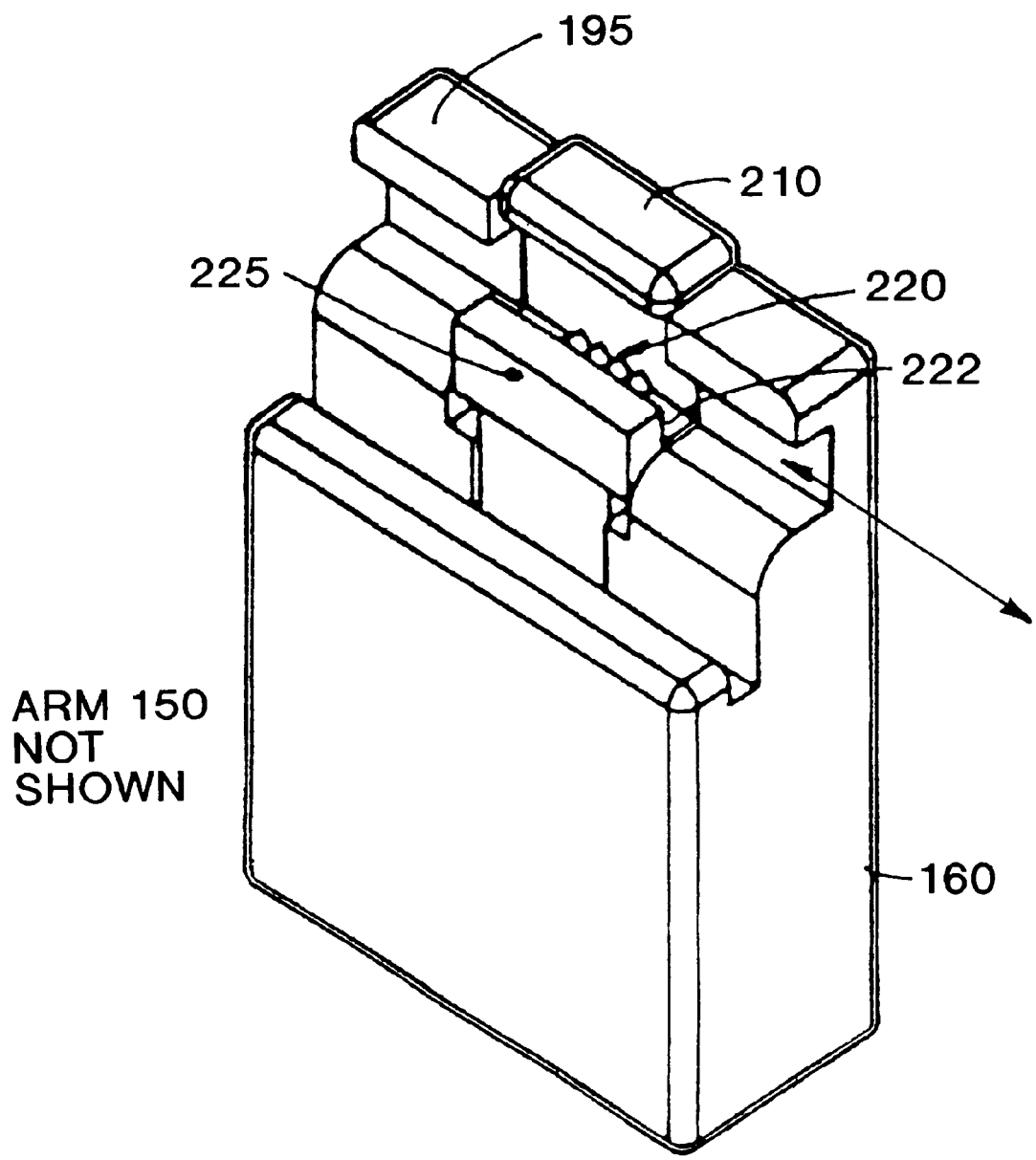
FIG. 7 is a top perspective rear view of an arm clip used in accordance with the device of the invention to couple the display-optics interface pod to the support member.

FIGS. 6 and 7 present detailed views of an embodiment of the invention having arm clip 160 connecting display arm 150 to support member 100. FIG. 6 shows arm clip 160 coupled to right handle portion 120 of support member 110. Arm clip 160 is mounted to right handle portion 120 through interlocking rails 190 and 195 of right handle portion 120 and arm clip 160, respectively. The interlocking rails are oriented along the front to back or rear direction along the support member. The interlocking rails also allow positional adjustment along the handle portion 120 of support member 100.

In FIGS. 6 and 7, the slidable adjustment position is held by a spring-loaded plunger 222 acting upward along a rack of teeth 200 on handle portion 120. Mating teeth 220 on plunger 222 engage teeth 200 in handle portion 120 to keep arm clip 160 in position. Release or sliding of arm clip 160 is accomplished by depressing button 210 on arm clip 160 which disengages opposing teeth 200 and 220, respectively, and allows movement of arm clip 160 along the rail of handle portion 120. In one embodiment, the total forward to backward sliding movement is limited to approximately one inch or 2.54 centimeters.

As noted above, an embodiment of the invention includes a reversible arm clip 160. In the embodiment described with reference to FIGS. 6 and 7, to remove arm clip 160 from handle portion 120, button 210 is depressed completely. The complete depression of button 210 displaces an engagement key 225 (in a downward direction) between arm clip 160 and handle portion 120, thus allowing a user to remove arm clip 160 from handle portion 120 by a pulling motion applied to arm clip 160 away from handle portion 120, and attach clip 160 to, for example, handle portion 110 by an opposite motion (e.g., depressing button 210 completely and pushing clip 160 into place on handle portion 110).

Figure 8:
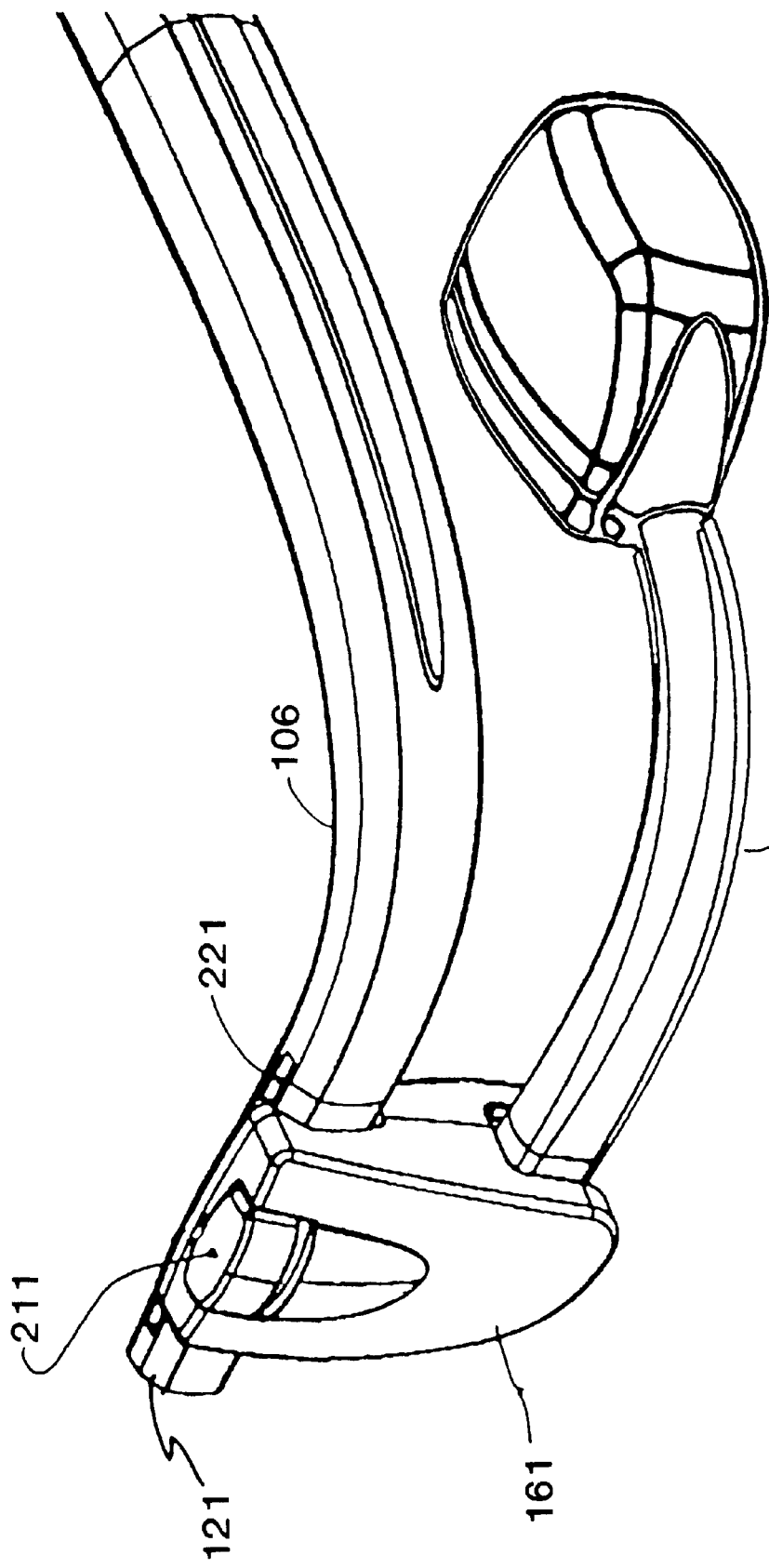
FIG. 8 is a top perspective front view of an arm clip used in accordance with the device of the invention to couple the display-optics interface pod to the support member.

FIG. 8 illustrates a second embodiment of the arm clip attachment/actuation mechanism in accordance with the invention. In FIG. 8, arm clip 161 is slidably coupled to handle portion 121 by engaging handle portion 121 through a slot 221 in handle portion 121. In this manner, handle portion 121 is engaged or coupled by a jaw in arm clip 161. The engagement is relaxed by depressing button 211 on arm clip 161, thus allowing arm clip 161 to be moved along slot 221 in handle portion 121. The depression of button 211 also allows arm clip 161 to be completely removed from handle portion 121 and relocated, for example, on the opposing handle portion.

Figure 9:
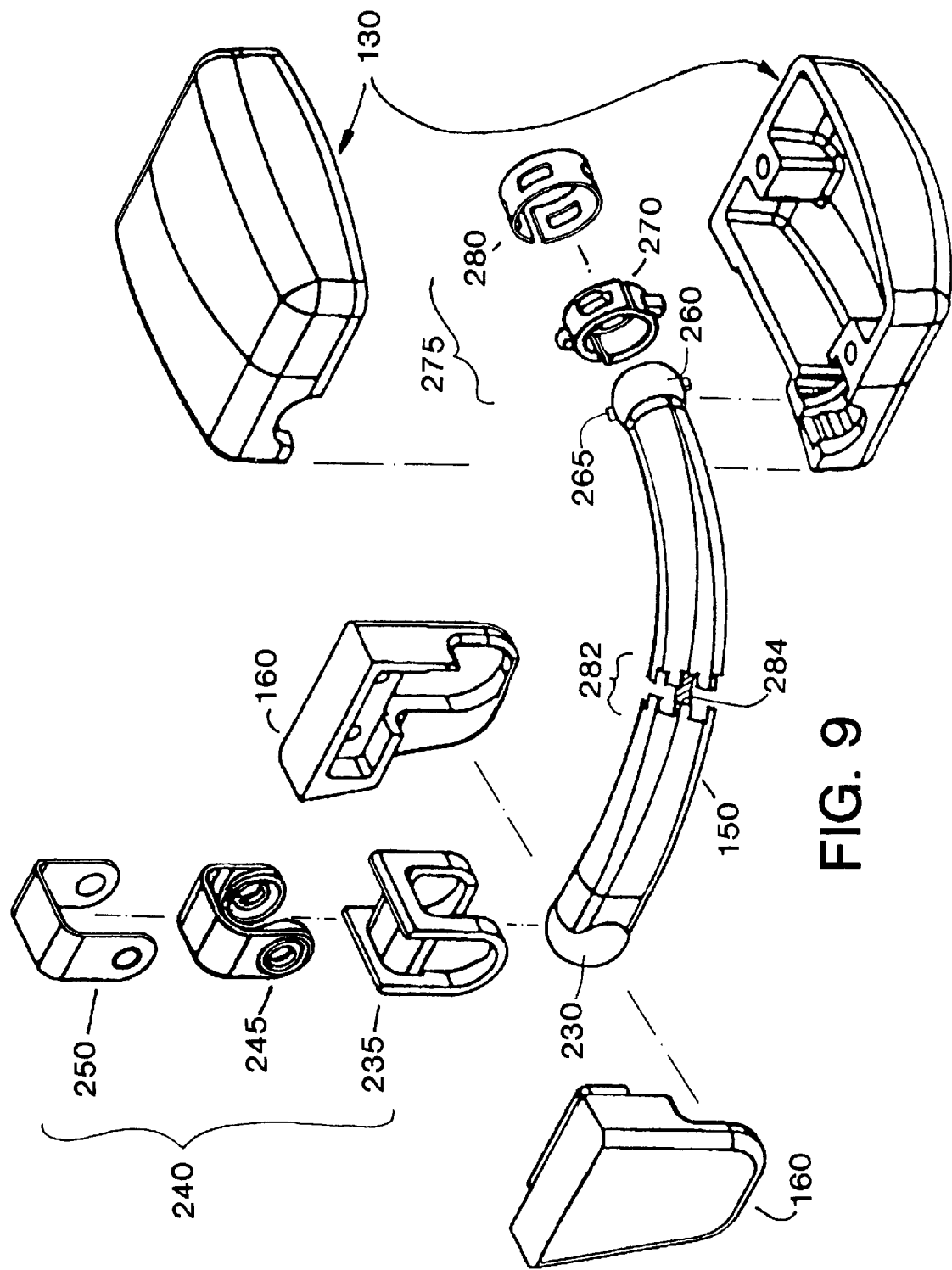
FIG. 9 is an exploded perspective top view of the adjustment mechanisms in the arm clip that attaches the display-optics interface pod to the support member and the display arm that couples the display-optics interface pod to the arm clip in accordance with the device of the invention.

FIG. 9 illustrates the rotational mechanisms employed relative to attachment clip 160 and display arm 150 as well as interface pod 130 and display arm 150. FIG. 9 is a partial exploded view of a portion of the device of the invention. With respect to the rotational mechanism of attachment clip 160 to display arm 150, the embodiment utilizes a ball and socket joint with a spherical ball 230 at one end of display arm 150. Spherical ball 230 fits to an elastomeric socket 240 mounted inside arm clip 160. Elastomeric socket 240 is made up of a frame 235, such as for example a durable plastic frame, an elastomer 245 that fits over frame 235 and a firm, durable spring 250 that applies frictional force and presses elastomer 245 against ball 230, such as for example, a metal spring. In the embodiment shown in FIG. 9, the lower side of socket 240 is open to allow the removal of display arm 150 from arm clip 160 by unsnapping the ball/arm from the socket and removing display arm 150 out the bottom of arm clip 160. Socket 240 remains within arm clip 160. Alternatively, a complete ball/socket assembly could remain attached to display arm 150 by attaching a socket housing to arm clip 160.

In one embodiment, display arm 150 is adjustable about the vertical axis of arm clip 160 to ±10 degrees, wherein the vertical axis is defined at the center of ball 230 in arm clip 160. The rotation of display arm 150 relative to a horizontal axis defined at the center of ball 230 in arm clip 160 is +10, −30 degrees (left/right axis) and ±180 degrees (forward/back axis) in this embodiment.

FIG. 9 also shows the adjustment mechanism of interface pod 130 to display arm 150. This is also a ball and socket joint with a spherical ball 260 at the other end of display arm 150 that fits to an elastomeric socket 275 mounted inside interface pod 130. Socket 275 is made up of an elastomer 270 surrounded by a spring, such as for example a metal spring, 280 that applies frictional force directly on each side of the socket and presses elastomer 270 against ball 260. Socket 275 is trapped and held by display pod 130 housing. This joint provides final axial adjustment to fit a user's visual axis. In the embodiment shown in FIG. 9, the rotational adjustment is limited by a peg 265 through ball 260. The optional peg 265 restricts rotation of pod 130 about ball 260. Of course, if no limitation is desired, peg 265 need not be included through ball 260. Defining a horizontal and vertical axis at the center of spherical ball 260 inside interface pod 130, one embodiment provides the following adjustments: vertical axis ±15 degrees; horizontal axis ±20 degrees (left/right axis); and horizontal axis ±10 degrees (forward/back axis).

FIG. 9 also illustrates another adjustment mechanism for viewing alignment of interface pod 130. In the embodiment shown in FIG. 9, display arm 150 is divided into two interlocking pieces at reference numeral 282. The interlocking pieces are held together by a tension spring 284 located in the void through display arm 150. To rotate interface pod 130, the interlocking pieces of display arm 150 are pulled apart, the pod end piece rotated a desired amount, predetermined by the interlocking mechanism, such as for example, 90 or 180 degrees, then the pieces are returned to an interlocked position.

Display arm 150 is a curved, tubular arm. The void or hollow center of arm 150 provides a conduit into the video pod for video cable 180. Cable 180 is for example a shielded multi-conductor hybrid cable that provides power and signal to display electronics in interface pod 130. In one embodiment, cable 180 is permanently attached inside interface pod 130/display arm 150 assembly.

As noted above, one embodiment of the invention contemplates that the monocular interface pod 130 is interchangeable between a user's left and right eye. This is accomplished in one embodiment by removing arm clip 160 from, for example, right handle portion 120 and mounting arm clip 160 to left handle portion 110 through a similar mounting bracket, such as for example interlocking rails along left hand portion 110 and arm clip 160. Secondly, display arm 150 which is attached to interface pod 130 is removed from arm clip 160 and inverted and reinstalled in arm clip 160 such that interface pod 130 will be before a user's left eye. The video display image of interface pod 130 is flipped electronically or manually so that an upright image is presented to a user's left eye.

The image can be flipped electronically or manually. One way to flip the image electronically is to change the addressing of the frame buffer. For example, a device that generates an address is configured so that when the pod is switched, for example, from the left handle portion to the right handle portion, a signal is sent to an address generator to change its read sequence. FIG. 10 presents an example wherein in one configuration (for example left eye configuration) an address generator reads bit signals from left-to-right, row-by-row, starting from the top left corner (1–575). When the pod is flipped, the address generator changes its read sequence to read bit signals from right-to-left, row-by-row, starting from the lower right corner to display an image on the display (575–1).

Changing the addressing of the frame buffer is one way of electronically flipping an image. It is to be appreciated that there may be other ways, for example, employing a state machine that reassigns addresses to the appropriate configuration, that will work and are encompassed in the invention.

As noted, the image can also be flipped manually. One way this is accomplished is through the rotation of interlocking pieces of display arm 150, a rotation illustrated in FIG. 9. Another way is to attach display arm 150 to the rear of interface pod 130, and rotating pod 130 about ball joint 260 of display arm 150 extending into the back of pod 130. These and other mechanisms are encompassed within the invention.

Figure 11:
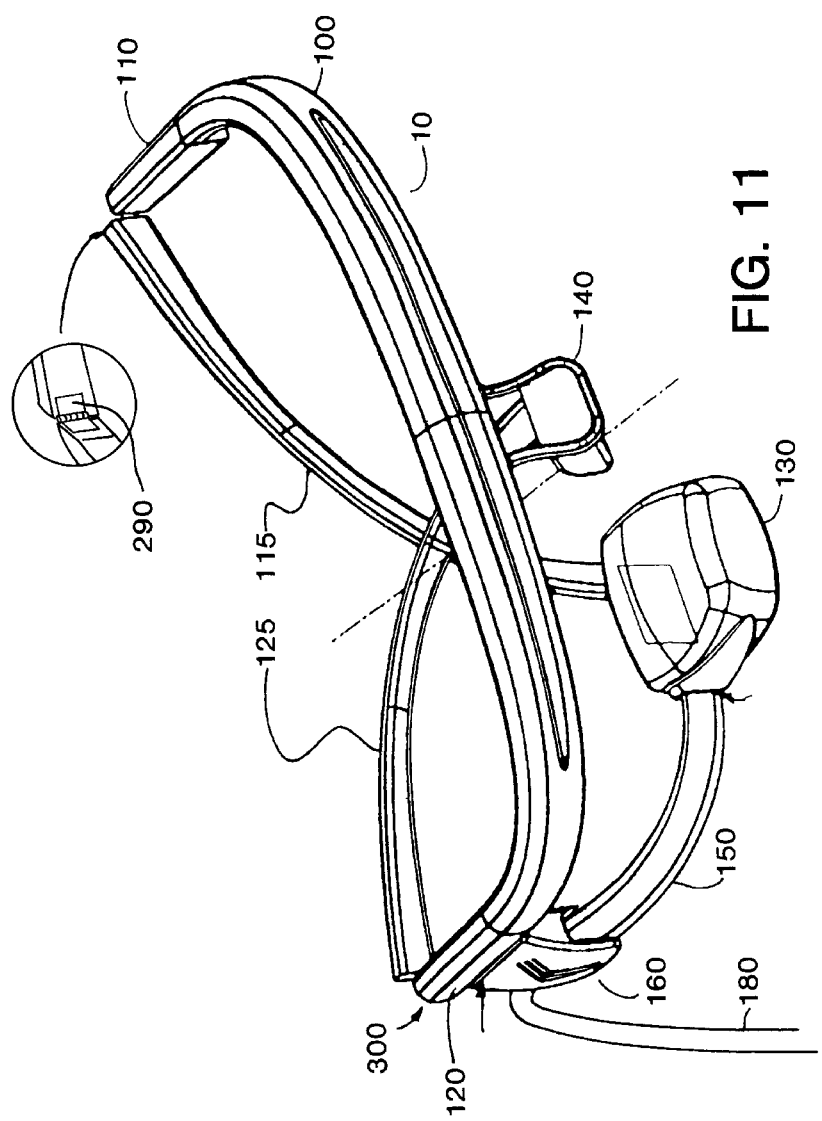
FIG. 11 is a top perspective view of an embodiment of the device of the invention wherein the support member has left arm and right arm portions that are hingedly coupled to the support member.

FIG. 11 shows another embodiment of the invention wherein display head-set device 10 includes foldable ear pieces 115 and 125, respectively, that allow the ear pieces to be folded so that the product may be stored more easily. The folding is accomplished such as for example by eye glass hinges 290 (shown in the circled, rear view insert in FIG. 11) and 300, respectively, and the ear pieces 115 and 125, respectively, fold like standard eye glasses at hinges 290 and 300, respectively. In another embodiment, ear pieces 115 and 125 are detachable and exchangeable for ear pieces of different sizes or styles.

Figure 12:
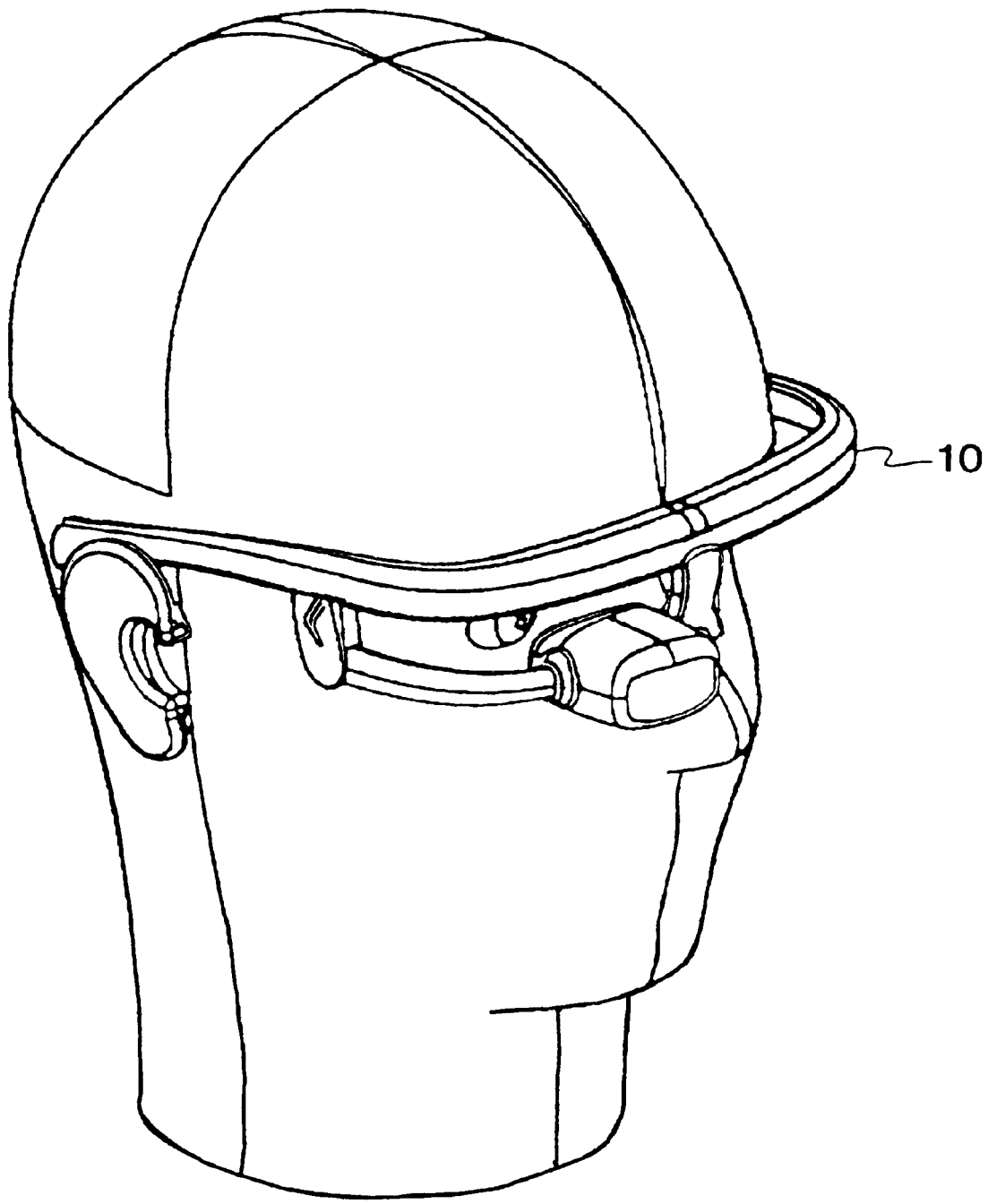
FIG. 12 is an embodiment of the device of the invention wherein the device is mounted on a user's head.
Figure 13:
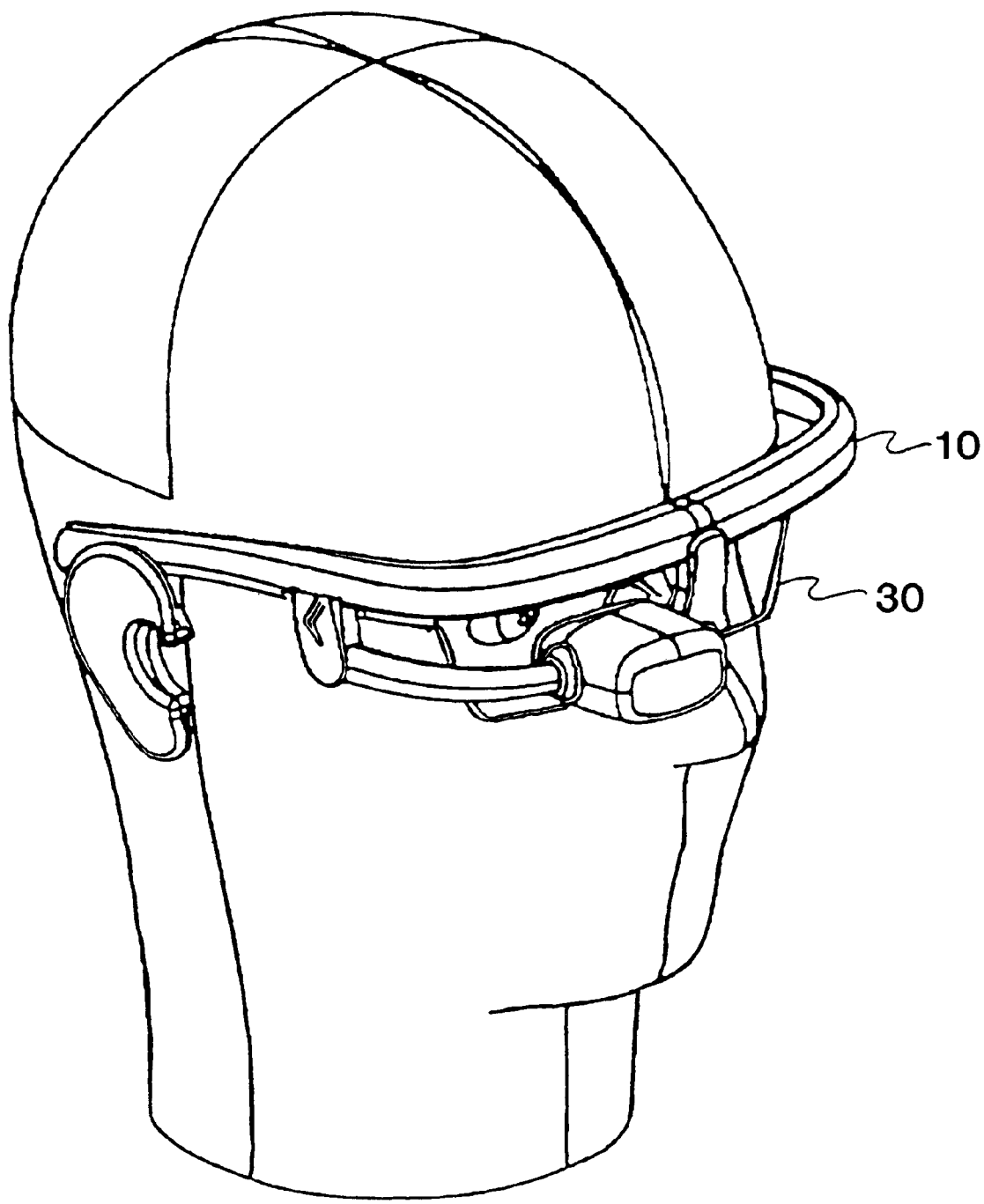
FIG. 13 is an embodiment of the device of the invention wherein the device is mounted on a user's head over a pair of conventional eye glasses.

FIG. 12 illustrates the use of the display head-set device of the invention on a user's head. Display head-set device 10 is worn comfortably like a pair of conventional eye glasses and the display image is viewed monocularly by either the user's left or right eye. FIG. 13 illustrates another embodiment of the invention wherein the display head-set device 10 is adapted to be worn over eye glasses 30. In this manner, a user can use the display head-set device without the removal of ordinary eye wear. Support member 100 has an inverted L-shape configuration to allow glasses 30 to nest in middle portion 105.

Figure 14:
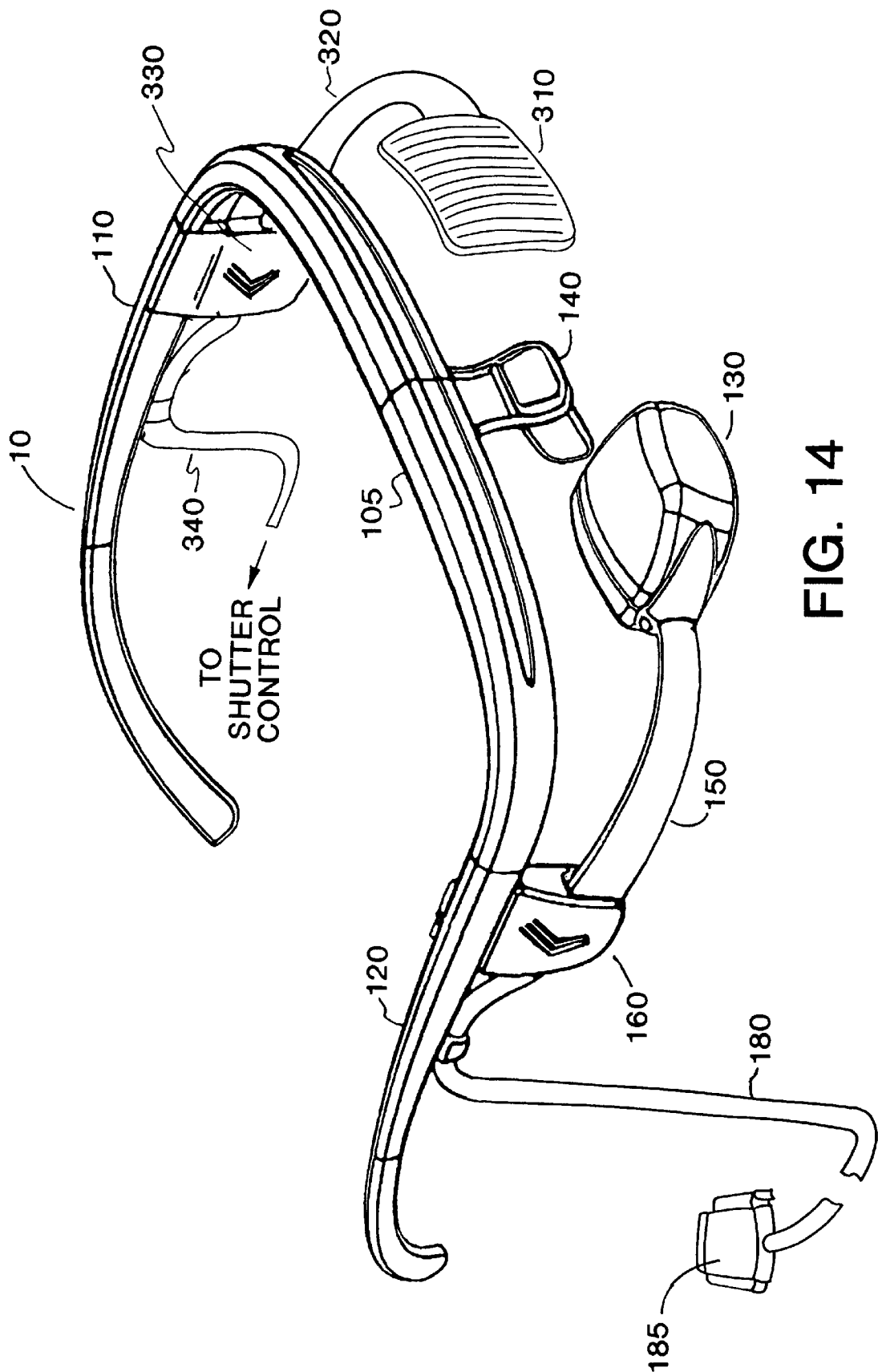
FIG. 14 is an embodiment of the device that includes a shutter or occluder to filter or block light and other distractions from the non-participatory eye.

FIG. 14 illustrates another embodiment of the invention wherein device 10 includes a shutter 310 to filter or substantially prevent or occlude distractions to the non-participatory eye of the viewer looking through display device 10. In FIG. 14, shutter or occluder 310 is a liquid crystal display shutter or occluder that is operable by a user through automated control, such as for example, a computer control. The automated control allows the shutter 310 to be open allowing light and other distractions to the non-participatory eye or partially or completely closed to filter out light or such distractions. Shutter 310 is attached to device 10 in a similar manner as interface display pod 130. Shutter 310 is connected to shutter arm 320 that is itself connected to arm clip 330. Arm clip 330 is similar to arm clip 160 and attaches to support member portion 110 in the same manner that arm clip 160 attaches to support member 120. Like the pod assembly described above, the shutter can be interchangeable between the right and left eyes. Further, the directional and rotational mechanisms discussed above with respect to interface pod 130 can be incorporated for use with shutter 310. Shutter 310 is linked to, for example, a computer through cable 340 which runs from a computer through shutter arm 320 to shutter 310. FIG. 14 shows an electronically controlled LCD shutter. It is to be appreciated that other shutter mechanisms, including a manually operated shutter, are contemplated.

In FIG. 14, shutter or occluder 310 is separately attached to support member 105. In another embodiment, the shutter or occluder is attached to the display interface pod or the pod assembly. In this manner, the pod and shutter or occluder can move together so that adjustment of the pod for one eye substantially adjusts the shutter or occluder for the other eye.

Figure 15:
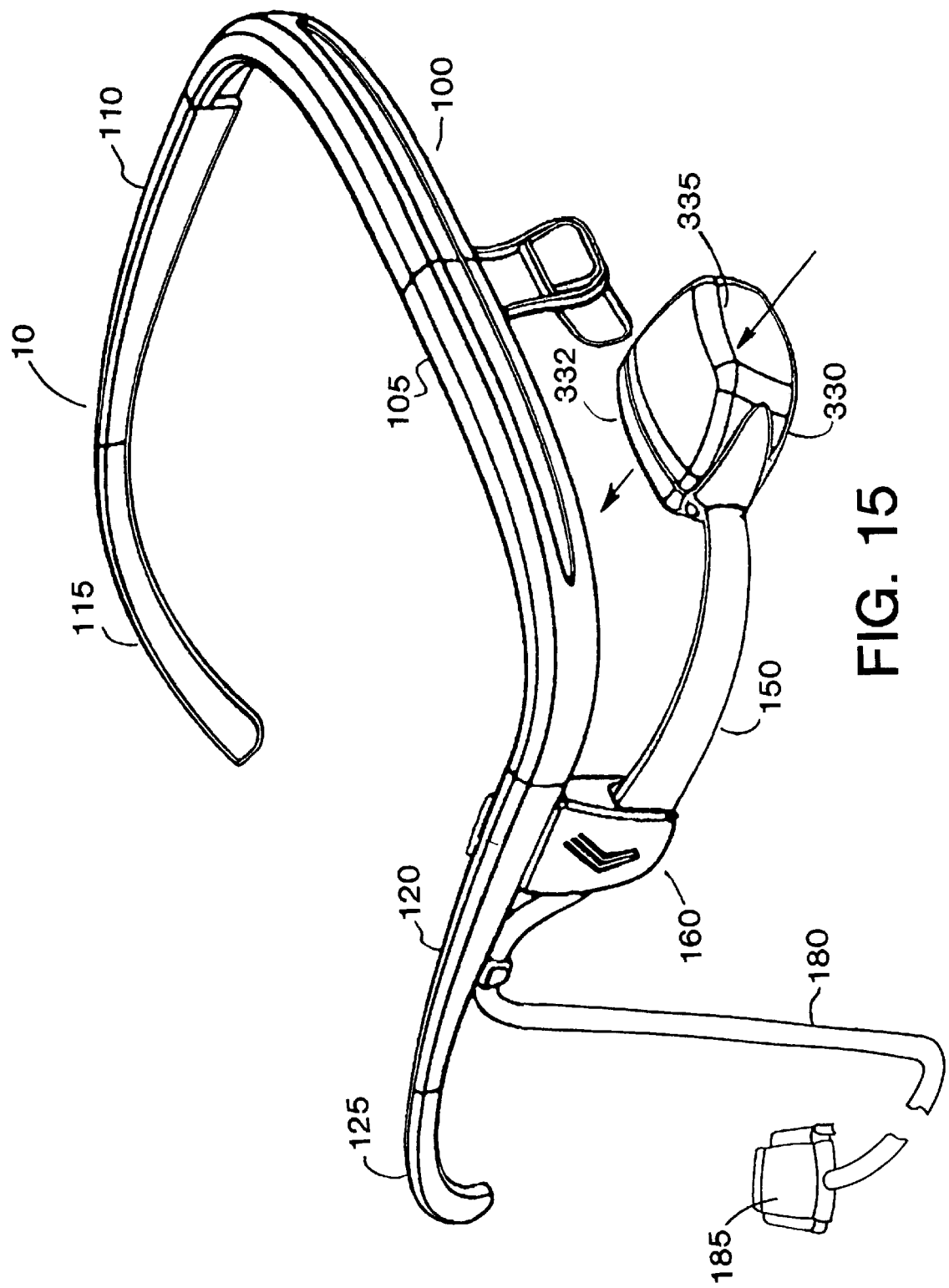
FIG. 15 is an embodiment of the device wherein the display is transmissive.

Interface pod 330 contains, for example, a liquid crystal display (LCD). The LCD may be a reflective or transmissive device as described in U.S. Pat. No. 5,426,526. In another embodiment, the pod is transmissive or see-through. FIG. 15 presents a device wherein display 335 of pod 330 is transmissive or see-through. Pod 330 consists of a display 332 on its front side and an opening or transparent window 335 on its rear side. In this embodiment, display 332 is transmissive so that a user may view an image in display 332 and view other things beyond display 332 and through window 335. One way this is done is by distributing the image engine in the pod so that the pod appears transmissive. For example, the back plane may be the bottom of pod 330, while light emitting diodes are placed on top of pad 330. A transparent beam splitter may be placed in the middle of pod 330 to direct an image to display 332.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A display head-set device, comprising
    a support member having a left handle portion, a right handle portion, and a middle portion disposed between said left handle portion and said right handle portion, said middle portion conforming generally to a superior ocular region of a human head;
    a display arm coupled to one of said left handle portion and said right handle portion of said support member;
    a display-optics interface pod coupled to said display arm; and
    an arm clip having a first end coupled to one of said left handle portion and said right handle portion of said support member, and a second end coupled to said display arm, wherein a portion of said first end of said arm clip is comprised of a plurality of teeth, and wherein an arm clip-engaging portion of one of said left handle portion and said right handle portion is comprised of a plurality of teeth, said handle portion teeth opposing said plurality of arm clip teeth, such that said first end of said arm clip is fixedly coupled to one of said left handle portion and said right handle portion of said support member by a mating of a portion of said plurality of arm clip teeth and a portion of said plurality of said handle portion teeth.

2. The device of claim 1, wherein said left handle portion has first end and a second end wherein said first end is coupled to said middle portion and wherein said right handle portion has a first end and a second end wherein said first end is coupled to said middle portion, said display further comprising:
    a left arm hingedly coupled to said second end of said left handle portion, said left arm conforming generally to a left side of a human head; and a right arm hingedly coupled to said second end of said right handle portion, said right arm conforming generally to a right side of a human head.

3. The device of claim 1, further comprising a left hinge coupled at one end to said second end of said left handle portion and at another end to said left arm and a right hinge coupled at one end to said second end of said right handle portion and at another end to said right arm, wherein said left arm folds about said left hinge and wherein said right arm folds about said right hinge.

4. A device comprising:

a support member adapted to be worn on the head of a user having a left handle portion, a right handle portion and a middle portion disposed between said left handle portion and said right handle portion;

a display interface pod coupled to said support member; and an occluder coupled to said support member and adapted to cover less than the entire field of view of an eye of a user, wherein a position of said display interface pod relative to said support member is adjustable and an adjustment to said display interface pod adjusts the position of the occluder.

5. The device of claim 4 further comprising a display arm pivotally coupled to a joint of said support member, wherein said display interface pod is pivotally coupled to said display arm.

* * * * *